United States Patent
Fonseca et al.

(10) Patent No.: US 8,623,463 B2
(45) Date of Patent: Jan. 7, 2014

(54) SOUND DEADENER COMPOSITION WITH EMULSION POLYMER STABILIZED BY PROTECTIVE COLLOIDS

(75) Inventors: Gledison Fonseca, Mannheim (DE); Dirk Wulff, Schifferstadt (DE); Axel Weiss, Speyer (DE); Lidcay Herrera Taboada, Barcelona (CH); Juergen Siroky, Mannheim (DE)

(73) Assignee: BASF SE, Ludwigshafen (DE)

( * ) Notice: Subject to any disclaimer, the term of this patent is extended or adjusted under 35 U.S.C. 154(b) by 295 days.

(21) Appl. No.: 13/186,637

(22) Filed: Jul. 20, 2011

(65) Prior Publication Data

US 2012/0027941 A1 Feb. 2, 2012

Related U.S. Application Data

(60) Provisional application No. 61/366,539, filed on Jul. 22, 2010.

(51) Int. Cl.
*B05D 7/00* (2006.01)
*C08F 2/44* (2006.01)

(52) U.S. Cl.
USPC ........... 427/385.5; 526/201; 252/62; 524/504

(58) Field of Classification Search
USPC ........... 526/201; 252/62; 524/504; 427/385.5
See application file for complete search history.

(56) References Cited

U.S. PATENT DOCUMENTS

| 6,502,821 | B2 | 1/2003 | Schneider |
| 2004/0033354 | A1 | 2/2004 | Fisher et al. |
| 2009/0286933 | A1 * | 11/2009 | Nagaishi et al. ............ 524/832 |

FOREIGN PATENT DOCUMENTS

| DE | 1 077 430 | 3/1960 |
| DE | 199 54 619 A1 | 5/2001 |
| EP | 0 081 083 A2 | 6/1983 |
| EP | 1 520 865 A2 | 4/2005 |
| GB | 922457 | 4/1963 |
| WO | WO 2007/034933 A1 | 3/2007 |
| WO | WO 2007/138053 A1 | 12/2007 |

OTHER PUBLICATIONS

U.S. Appl. No. 13/211,856, filed Aug. 17, 2011, Fonseca, et al.
U.S. Appl. No. 61/375,052, Aug. 19, 2010, Fonseca, et al.
D.D.L. Chung, "Review Materials for vibration damping", Journal of Materials Science, vol. 36, 2001, pp. 5733-5737.

* cited by examiner

*Primary Examiner* — Vu A Nguyen
(74) *Attorney, Agent, or Firm* — Oblon, Spivak, McClelland, Maier & Neustadt, L.L.P.

(57) ABSTRACT

A description is given of the use of a polymer dispersion for preparing sound deadener compositions, the polymer dispersion being obtainable by emulsion polymerization of free-radically polymerizable monomers in the presence of at least one protective colloid which is an amphiphilic graft copolymer. Preferred protective colloids have a polyalkylene oxide main chain and vinyl ester-comprising side chains. A description is also given of corresponding sound deadener compositions which comprise the polymer dispersion, and of a method for damping oscillations or vibrations of vehicle components.

13 Claims, No Drawings

SOUND DEADENER COMPOSITION WITH EMULSION POLYMER STABILIZED BY PROTECTIVE COLLOIDS

The invention relates to the use of a polymer dispersion for preparing sound deadener compositions, the polymer dispersion being obtainable by emulsion polymerization of free-radically polymerizable monomers in the presence of at least one protective colloid which is an amphiphilic graft copolymer. The invention also relates to corresponding sound deadener compositions which comprise the polymer dispersion, and to a method for damping oscillations or vibrations of vehicle components.

Oscillations or vibrations of machinery or vehicle components generate unwanted noise. For noise reduction, the components can be treated with what are called sound deadener compositions, also referred to as LASD (liquid applied sound damping) compositions. Vibration-damping materials are described, for example, in Journal of Materials Science 36 (2001) 5733-5737, US 2004/0033354, and U.S. Pat. No. 6,502,821. Geometrically complex, three-dimensional components can be treated by spray application of a sound deadener composition in the form of an aqueous dispersion. Dispersions of this kind generally comprise a dispersed viscoelastic polymer and inorganic fillers. Vibration-damping compositions based on water-based polymer dispersions and inorganic fillers along with further auxiliaries are known from EP 1520865 and from WO 2007/034933. The quality of a sound deadener composition can be measured by measuring the flexural vibrations by the resonance curve method in accordance with ISO 6721-1 and ISO 6721-3. One measure of the vibration-damping effect is the loss factor tan delta. When sound deadener compositions based on viscoelastic polymers are used, the loss factor is temperature-dependent. The desire is for materials which result in a maximal loss factor in the temperature range in which the machinery or vehicles are typically operated, at between 0 and 40° C., for example. It was an object of the present invention to provide further materials having good or improved vibration-damping properties.

It has been found that the emulsifiers present in known sound deadener compositions based on polymer dispersions, for the purpose of stabilizing the polymers, may adversely affect the vibration-damping properties, and that the effectiveness of the sound deadener compositions can be increased if certain protective colloids are used to stabilize the polymers in the aqueous dispersion.

The invention accordingly provides for the use of a polymer dispersion for preparing sound deadener compositions, the polymer dispersion being obtainable by emulsion polymerization of free-radically polymerizable monomers in the presence of at least one protective colloid which is an amphiphilic graft copolymer. One preferred use is the use of the sound deadener composition of the invention for vibration damping of vehicle bodywork parts.

The invention also provides a sound deadener composition comprising
(a) a polymer dispersion comprising at least one polymer which is obtainable by emulsion polymerization of free-radically polymerizable monomers and is dispersed in water, and at least one protective colloid which is an amphiphilic graft copolymer, and
(b) inorganic fillers.

An amphiphilic copolymer is a copolymer which comprises both hydrophilic regions and hydro-phobic regions. Hydrophilic regions are polymeric regions in which the hydrophilic monomer units on which they are based have a greater water-solubility than the hydrophobic monomeric units on which the hydrophobic regions are based. A graft copolymer is a polymer having a main chain with at least one, preferably two or more, side chains grafted on it. The average degree of grafting of the graft copolymer is preferably at least 0.05, more particularly at least 0.1, graft sites per 50 monomeric units of the main chain. Protective colloids are polymeric compounds which bind large amounts of water on solvation and are capable of stabilizing dispersions of water-insoluble polymers. The protective colloids are used preferably in an amount of 0.5 to 60 parts by weight or of 1 to 30 parts by weight, more preferably of 7% to 30% by weight (more particularly when the overall solids content of the composition of the invention is more than 50% by weight), based on 100 parts by weight of the monomers to be polymerized.

Preferred graft copolymers comprise a main chain having water-soluble polyalkylene oxide units and side chains having polyvinyl ester units. Polyalkylene oxide units are, for example, polyethylene oxide, polypropylene oxide or a mixture thereof, more particularly ethylene oxide/propylene oxide block copolymers. Polyethylene oxide is particularly preferred. Vinyl esters are, for example, vinyl acetate and vinyl propionate. Vinyl acetate is particularly preferred. A preferred amphiphilic protective colloid comprises a main chain with polyethylene oxide units and side chains with polyvinyl acetate units. Suitable graft copolymers based on polyalkylene oxides and vinyl esters, and their preparation, are described in WO 2007/138053, DE 1077430, and GB 922457.

The weight-average molecular weight Mw of the graft copolymers is preferably from 500 to 100 000, more particularly from 1000 to 60 000 or from 1500 to 20 000.

Preferred amphiphilic graft copolymers have from 10% to 50%, preferably from 20% to 45% or from 30% to 40%, by weight of water-soluble polyalkylene oxides, preferably polyethylene oxide, as main chain, and 50% to 90%, preferably from 55% to 80% or from 60% to 70%, by weight of side chains formed by free-radical polymerization, the side chains being formed preferably of 70% to 100% by weight of vinyl acetate, vinyl propionate or a mixture thereof and of 0% to 30% by weight of further, different, ethylenically unsaturated monomers. The weight ratio of polyalkylene oxide units to vinyl ester units is preferably at least 20/80 or at least 30/70 and preferably up to 80/20, up to 40/60, up to 50/50 or up to 45/55.

In one embodiment the amphiphilic protective colloid comprises
(A) from 10% to 50% by weight, based on the overall polymer, of water-soluble polyalkylene oxides as main chain and
(B) from 50% to 90% by weight, based on the overall polymer, of side chains, the side chains being formed by free-radical polymerization of
(B1) 70% to 100% by weight, based on the side chains, of vinyl esters selected from vinyl acetate, vinyl propionate, and a mixture thereof, and
(B2) 0% to 30% by weight, based on the side chains, of further, ethylenically unsaturated, free-radically polymerizable monomers.

Suitable water-soluble polyalkylene oxides are more particularly C2-C4 alkylene oxides which comprise at least 50%, preferably at least 60%, at least 75% or 100% by weight of ethylene oxide in polymerized form. The polyalkylene oxide main chain may comprise OH end groups or one or two ether end groups, e.g., C1-C25 alkyl ethers, phenyl ethers or C1-C14 alkylphenyl ethers.

Water-soluble polyalkylene oxides suitable as main chain are, for example, polyethylene glycol having a number-average molecular weight Mn of preferably 1500 to 20 000 or 2500 to 15 000, in which none, one or both of the end groups may be C1 to C25 alkyl groups; copolymers of ethylene oxide, propylene oxide and/or butylene oxide having an ethylene oxide content of at least 50% by weight, with a number-average molecular weight Mn of preferably 1500 to 20 000 or 2500 to 15 000, where none, one or both of the end groups may be C1 to C25 alkyl groups; polyesters or polyurethanes having a number-average molecular weight Mn of preferably 2500 to 20 000, formed from C2-C12 dicarboxylic acids or C6-C18 diisocyanates and polyalkylene glycols having a number-average molecular weight Mn of preferably 200 to 5000, the polyalkylene glycols being selected from polyethylene glycol and copolymers of ethylene oxide, propylene oxide and/or butylene oxide having an ethylene oxide content of at least 50% by weight. Polyethylene glycol is particularly preferred.

The side chains are preferably formed by polymerization of vinyl esters in the presence of the polyalkylene oxides. Suitable vinyl esters are vinyl acetate, vinyl propionate, and a mixture thereof. Vinyl acetate is preferred. The side chains may alternatively be formed by copolymerization of vinyl acetate and/or vinyl propionate and at least one further, different, ethylenically unsaturated comonomer. The fraction of the further comonomers is preferably from 0% to 30% by weight, e.g., from 0.5% to 25% by weight, based on the sum of the monomers used for side chain formation, or from 0% to 24% by weight, e.g., from 0.4% to 20% by weight, from 1% to 15% by weight or from 2% to 10% by weight, based on the graft copolymer.

In the text below, the designation "(meth)acryl . . . " and similar designations are used as an abbreviated notation for "acryl . . . or methacryl . . . ".

Suitable as further comonomers are, for example, monoethylenically unsaturated monocarboxylic and dicarboxylic acids and their derivatives, and also styrene. Suitable acid derivatives are, for example, esters, amides, and anhydrides. These further comonomers may be used individually or in a mixture. Specific examples are as follows: (meth)acrylic acid, C1-C12 (meth)acrylates, C2-C12 hydroxyalkyl (meth)acrylates, (meth)acrylamide, N—C1-C12 alkyl-(meth)acrylamide, N,N-di(C1-C12 alkyl)(meth)acrylamide, maleic acid, maleic anhydride, and mono-C1-C12 alkyl esters of maleic acid. Preferred further comonomers are C1-C8 alkyl (meth) acrylates and hydroxyethyl acrylate, more particularly C1-C4 alkyl (meth)acrylates. Methyl acrylate, ethyl acrylate, and n-butyl acrylate are particularly preferred.

The polymer dispersions of the invention are dispersions of polymers in an aqueous medium. This may, for example, be exclusively water or else may be mixtures of water and a solvent which is miscible therewith, such as methanol, ethanol or tetrahydrofuran. It is preferred not to use organic solvents. The solids contents of the dispersions are preferably from 15% to 75%, more preferably from 40% to 60%, more particularly greater than 50%, by weight. The solids content may be accomplished, for example, by appropriate adjustment of the amount of water used in the emulsion polymerization, and/or of the monomer amounts. The average particle size of the polymer particles dispersed in the aqueous dispersion is preferably smaller than 400 nm, more particularly smaller than 300 nm. With particular preference the average particle size is between 140 and 250 nm. By average particle size here is meant the $d_{50}$ of the particle size distribution, i.e., 50% by weight of the total mass of all the particles has a particle diameter smaller than the $d_{50}$. The particle size distribution can be determined in a known way using the analytical ultracentrifuge (W. Mächtle, Makromolekulare Chemie 185 (1984), pages 1025-1039). The pH of the polymer dispersion is adjusted preferably to a pH of more than 4, more particularly to a pH of between 5 and 9.

The polymer dispersions of the invention preferably have a low emulsifier content, i.e., they comprise emulsifiers (non-polymeric, amphiphilic, surface-active substances added to the polymerization mixture) in an amount of preferably less than 3% or less than 1% by weight. Emulsifier-free systems are particularly preferred. In one embodiment of the invention, therefore, the emulsion polymerization carried out in the presence of the protective colloid takes place in emulsifier-free form, i.e. without addition of emulsifiers.

The polymers prepared by emulsion polymerization are polymers obtainable by free-radical polymerization of ethylenically unsaturated compounds (monomers). The polymer is composed preferably of at least 40% or of at least 60%, or of at least 80%, more preferably of at least 90% or of 100%, by weight, of one or more of the principal monomers described below. The principal monomers are preferably selected from C1 to C20 alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

Nature and amount of the monomers are preferably such that the glass transition temperature of the polymer prepared by emulsion polymerization is in the range from −60° C. to less than or equal to 70° C. or in the range from −30° C. to less than or equal to 60° C., more preferably in the range from −15 to 50° C. The glass transition temperature can be determined by differential scanning calorimetry (ASTM D 3418-08, midpoint temperature).

Suitable monomers are, for example, (meth)acrylic acid alkyl esters having a $C_1$-$C_{10}$ alkyl radical, such as methyl methacrylate, methyl acrylate, n-butyl acrylate, ethyl acrylate, and 2-ethylhexyl acrylate. Also suitable more particularly are mixtures of the (meth)acrylic acid alkyl esters. Vinyl esters of carboxylic acids having 1 to 20 C atoms are, for example, vinyl laurate, vinyl stearate, vinyl propionate, vinyl esters of Versatic acid, and vinyl acetate. Vinylaromatic compounds contemplated include vinyltoluene, alpha- and para-methylstyrene, alpha-butylstyrene, 4-n-butylstyrene, 4-n-decylstyrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether and vinyl isobutyl ether. Preferred vinyl ethers are those of alcohols comprising 1 to 4 C atoms. Suitable hydrocarbons having 4 to 8 C atoms and two olefinic double bonds are, for example, butadiene, isoprene, and chloroprene.

Preferred principal monomers are $C_1$ to $C_{10}$ alkyl acrylates and $C_1$ to $C_{10}$ alkyl methacrylates, more particularly $C_1$ to $C_8$ alkyl acrylates and methacrylates, and vinylaromatics, more particularly styrene, and mixtures thereof. Especially preferred are methyl acrylate, methyl methacrylate, ethyl acrylate, n-butyl acrylate, n-hexyl acrylate, octyl acrylate, and 2-ethylhexyl acrylate, 2-propylheptyl acrylate, styrene, and mixtures of these monomers. More particularly the polymers are composed of at least 60%, more preferably of at least 80%, and very preferably of at least 90% or at least 95%, by weight, of $C_1$ to $C_{10}$ alkyl (meth)acrylates.

In addition to the principal monomers, the polymer may comprise further monomers, examples being ethylenically unsaturated monomers having carboxylic, sulfonic or phosphonic acid groups (acid monomers). Carboxylic acid groups are preferred. Examples include acrylic acid, methacrylic acid, itaconic acid, maleic acid, and fumaric acid. Preferably, however, the polymer prepared by emulsion polymerization is free from acid groups.

Further monomers are also, for example, monomers comprising hydroxyl groups, more particularly $C_1$-$C_{10}$ hydroxyalkyl (meth)acrylates, or (meth)acrylamide. Other further monomers include phenyloxyethylglycol mono(meth)acrylate, glycidyl (meth)acrylate, and aminoalkyl (meth)acrylates such as 2-aminoethyl (meth)acrylate, for example. Alkyl groups have preferably from 1 to 20 C atoms. Other further monomers include crosslinking monomers.

The polymer is composed more particularly of at least 60%, more preferably of at least 80%, e.g., from 60% to 100%, and very preferably of at least 95% or of 100%, by weight, of at least one $C_1$ to $C_{20}$ alkyl acrylate, at least one $C_1$ to $C_{20}$ alkyl methacrylate, a mixture thereof, or a mixture thereof with styrene.

The polymers can be prepared by emulsion polymerization, the product then being an emulsion polymer. In the course of the emulsion polymerization it is usual to use ionic and/or nonionic emulsifiers and/or protective colloids, or stabilizers, as interface-active compounds in order to assist the dispersing of the monomers in the aqueous medium. In accordance with the invention, one or more of the aforementioned protective colloids may be used as sole dispersant, i.e., without the addition of emulsifiers. If desired, however, small amounts of emulsifiers may also be used as well. The emulsion polymerization takes place preferably in the presence of at least one protective colloid, without addition of a nonpolymeric emulsifier.

If emulsifiers are used as additional interlace-active substances, they are preferably anionic or nonionic emulsifiers. Suitable emulsifiers are, for example, ethoxylated $C_8$ to $C_{36}$- or $C_{12}$ to $C_{18}$ fatty alcohols having a degree of ethoxylation of 3 to 50 or of 4 to 30, ethoxylated mono-, di-, and tri-$C_4$ to $C_{12}$ or $C_4$ to $C_9$ alkyl-phenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids. Cationic emulsifiers are, for example, compounds having at least one amino group or ammonium group and at least one C8-C22 alkyl group. Further suitable emulsifiers are compounds of the general formula

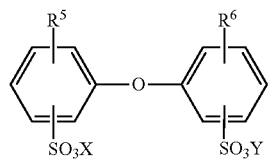

in which $R^5$ and $R^6$ are hydrogen or $C_4$ to $C_{14}$ alkyl and are not simultaneously hydrogen, and X and Y may be alkali metal ions and/or ammonium ions. Preferably, $R^5$ and $R^6$ are linear or branched alkyl radicals having 6 to 18 C atoms or hydrogen, and more particularly having 6, 12, and 16 C atoms, and $R^5$ and $R^6$ are not both simultaneously hydrogen. X and Y are preferably sodium, potassium or ammonium ions, with sodium being particularly preferred. Particularly advantageous are compounds II in which X and Y are sodium, $R^5$ is a branched alkyl radical having 12 C atoms, and $R^6$ is hydrogen or $R^5$. Use is frequently made of technical mixtures which include a fraction of 50% to 90% by weight of the monoalkylated product, an example being Dowfax® 2A1 (trademark of the Dow Chemical Company). Suitable emulsifiers are also found in Houben-Weyl, Methoden der organischen Chemie, volume 14/1, Makromolekulare Stoffe [Macromolecular compounds], Georg Thieme Verlag, Stuttgart, 1961, pages 192 to 208. Emulsifier tradenames are, for example, Dowfax® 2 A1, Emulan® NP 50, Dextrol® OC 50, Emulgator 825, Emulgator 825 S, Emulane® OG, Texapon® NSO, Nekanil® 904 S, Lumiten® I-RA, Lumiten® E 3065, Disponil® FES 77, Lutensol® AT 18, Steinapol® VSL, and Emulphor® NPS 25. Also suit-able are copolymerizable emulsifiers which comprise a free-radically polymerizable, ethylenically unsaturated double bond, examples being reactive anionic emulsifiers such as Adeka® Resoap SR-10.

The emulsion polymerization takes place in general at 30 to 130° C., preferably 50 to 90° C. The polymerization medium may be composed either only of water, or of mixtures of water and water-miscible liquids such as methanol. It is preferred to use just water. The emulsion polymerization may be carried out either as a batch operation or in the form of a feed process, including staged or gradient procedures.

Preference is given to the feed process, in which a portion of the polymerization batch is introduced as an initial charge and heated to the polymerization temperature, polymerization is commenced, and then the remainder of the polymerization batch, typically via two or more spatially separate feeds, of which one or more comprise the monomers in pure form or in an emulsified form, is supplied continuously, in stages or under a concentration gradient to the polymerization zone, with the polymerization being maintained. In the polymerization it is also possible to include a polymer seed in the initial charge, in order, for example, to set the particle size more effectively.

The emulsion polymerization is carried out in the presence of at least one protective colloid. This means that the protective colloids are included in the initial charge or supplied together with monomers to the polymerization vessel. In the emulsion polymerization they are preferably included in the initial charge, while any additionally added emulsifiers may be supplied together with the monomers in the course of the polymerization as well.

For the emulsion polymerization it is possible to use the typical and known auxiliaries, such as water-soluble initiators and chain-transfer agents. Water-soluble initiators for the emulsion polymerization are, for example, ammonium salts and alkali metal salts of peroxydisulfuric acid, e.g., sodium peroxodisulfate, hydrogen peroxide or organic peroxides, e.g., tert-butyl hydroperoxide. Also suitable are what are called reduction-oxidation (redox) initiator systems. The redox initiator systems are composed of at least one usually inorganic reducing agent and one organic or inorganic oxidizing agent. The oxidizing component comprises, for example, the initiators already specified above for the emulsion polymerization. The reducing components comprise, for example, alkali metal salts of sulfurous acid, such as sodium sulfite, sodium hydrogensulfite, alkali metal salts of disulfurous acid such as sodium disulfate, bisulfite addition compounds of aliphatic aldehydes and ketones, such as acetone bisulfite, or reducing agents such as hydroxymethanesulfinic acid and its salts, or ascorbic acid. The redox initiator systems may be used along with soluble metal compounds whose metallic component is able to occur in a plurality of valence states. Examples of typical redox initiator systems include ascorbic acid/iron(II) sulfate/sodium peroxydisulfate, tert-butyl hydroperoxide/sodium disulfite, tert-butyl hydroperoxide/Na hydroxymethanesulfinic acid or tert-butyl hydroperoxide/ascorbic acid. The individual components, the reducing component for example, may also be mixtures, an example being a mixture of the sodium salt of hydroxymethanesulfinic acid and sodium disulfite. The stated corn-pounds are used usually in the form of aqueous solutions, with the lower concentration being determined by the amount of water which is acceptable in the dispersion, and the upper concentration by the solubility of the respective compound in water. In general the concentration is 0.1% to 30%, preferably 0.5% to 20%, more preferably 1.0% to 10%, by weight, based on the solution. The amount of the initiators is generally 0.1% to 10%, preferably 0.5% to 5%, by weight, based on the monomers to be polymerized. It is also possible for two or more different initiators to be used for the emulsion polymerization. For the purpose of removing the residual monomers, it is typical for initiator to be added after the end of the actual emulsion polymerization as well.

In the polymerization it is possible to use chain-transfer agents (molecular-weight regulators), in amounts, for example, of 0 to 0.8 part by weight, based on 100 parts by weight of the monomers to be polymerized, by means of which the molar mass is lowered. Suitability is possessed, for example, by compounds having a thiol group such as tert-butyl mercaptan, thioglycolic esters, e.g., 2-ethylhexyl thioglycolate, mercaptoethanol, mercaptopropyltrimethoxysilane, n-dodecyl mercaptan or tert-dodecyl mercaptan. It is additionally possible to use chain-transfer agents without a thiol group, such as C6 to C20 hydrocarbons which on hydrogen abstraction form a pentadienyl radical, e.g., terpinolene. In one preferred embodiment the emulsion polymer is prepared using 0.05% to 0.5% by weight, based on the monomer amount, of at least one chain-transfer agent.

In the emulsion polymerization, aqueous dispersions of the polymer are obtained with solids contents generally of 15% to 75%, preferably of 40% to 75%, by weight. For a high space/time yield of the reactor, dispersions with as high a solids content as possible are preferred. In order to be able to achieve solids contents >60% by weight, a bimodal or polymodal particle size ought to be set, since otherwise the viscosity becomes too high and the dispersion can no longer be handled. Producing a new particle generation can be accomplished by addition of seed (EP 81083), by addition of excess quantities of emulsifier or by addition of miniemulsions. A further advantage associated with the low viscosity at high solids content is the improved coating behavior at high solids contents. Producing one or more new particle generations can be done at any desired point in time. This point in time is guided by the particle size distribution that is desired for a low viscosity.

In one preferred embodiment the polymer has a core-shell morphology or is preparable by at least two-stage polymerization, the glass transition temperature of the core-forming polymer (A) being different by at least 10° C., preferably by at least 15° C. or at least 20° C., e.g., by 10 to 50° C., than the glass transition temperature of the shell-forming polymer (B), or the glass transition temperature of the polymer (B) formed in the first polymerization stage being different by at least 10° C., preferably by at least 15° C. or at least 20° C., e.g., by 10 to 50° C., than the glass transition temperature of the polymer formed in the second polymerization stage (A). This embodiment relates, therefore, to aqueous polymer dispersions in which the polymer particles have at least two mutually different polymer phases (A) and (B) having different glass transition temperatures. This has the advantage that sound deadener compositions produced therewith possess vibration-damping effects across a wider temperature range. The glass transition temperature of the core is preferably greater than the glass transition temperature of the shell.

With regard to the core-shell particles, the surface of the core is covered fully or at least partly with the shell-forming polymers. Core-shell particles preferably have an average particle diameter of 10 nm to 1 micrometer or of 20 nm to 500 nm, measurable using a dynamic light scattering photometer. Both for polymer (A) and for the different polymer (B), the polymers in question are preferably acrylate copolymers, the nature and amount of the monomers being such as to ensure at least the minimum difference in glass transition temperatures. Suitable acrylate co-polymers for forming at least two-phase polymer particles are described in WO 2007/034933, EP 1520865, and DE19954619, for example.

Polymer dispersions having at least two-phase polymer particles are preferably obtainable by free-radical aqueous emulsion polymerization comprising the following steps:
a) polymerization of a first monomer charge M1 to form a polymer P1 having a theoretical glass transition temperature Tg(1) (according to Fox) and
b) polymerization of a second monomer charge M2 to form a polymer P2 having a theoretical glass transition temperature Tg(2) (according to Fox) that is different from Tg(1), in the aqueous dispersion of the polymer P1, where at least one chain transfer reagent is used either during the polymerization of the monomer charge M1 or during the polymerization of the monomer charge M2.

By a theoretical glass transition temperature is meant, here and below, the glass transition temperatures Tg(1) and Tg(2), respectively, calculated according to Fox on the basis of the monomer composition of the monomer charge M1 and of the monomer charge M2, respectively. According to Fox (T. G. Fox, Bull. Am. Phys. Soc. (Ser. II) 1, 123 [1956] and Ullmann's Enzyklopädie der technischen Chemie, Weinheim (1980), pp. 17, 18), the glass transition temperature of copolymers at high molar masses is given in good approximation by $$1/Tg = x1/Tg(1) + x2/Tg(2) + \ldots + xn/Tg(n)$$

where x1, x2, ... xn are the mass fractions 1, 2, ..., n and Tg(1), Tg(2), ..., Tg(n) are the glass transition temperatures of the polymers composed in each case only of one of the monomers 1, 2, ..., n, in degrees Kelvin. The latter are known, for example, from Ullmann's Encyclopedia of Industrial Chemistry, VCH, Weinheim, Vol. A 21 (1992) p. 169 or from J. Brandrup, E. H. Immergut, Polymer Handbook 3rd ed., J. Wiley, New York 1989.

With preference in accordance with the invention the monomer charge M2 is selected such that the theoretical glass transition temperature (according to Fox) of the resulting polymer phase P2 lies above the theoretical glass transition temperature of the polymer P1 prepared first. In that case the monomer charge M2 preferably has a composition which leads to a theoretical glass transition temperature Tg(2) for the polymer phase P2 which is above 30° C., preferably above 40° C., and more particularly in the range from 50 to 120° C. Where Tg(2) is greater than Tg(1), the monomer charge M1 preferably has a monomer composition which leads to a theoretical glass transition temperature Tg(1) for the resulting polymer phase P1 that is in the range from −40 to +40° C., preferably in the range from −30 to +30° C., and very preferably in the range from −10 to +25° C. Where Tg(1) is greater than Tg(2), the preferred glass transition temperatures of the polymer phase P1 are subject to the statement made above for P2 in the case of Tg(2) being greater than Tg(1). For the glass transition temperatures of the polymer phase P2, the statements made above for Tg(1) then apply correspondingly.

In the polymer dispersions of the invention, the weight ratio of the polymer phases to one another is in the range from 20:1 to 1:20, preferably 9:1 to 1:9. Preference is given in accordance with the invention to those polymer dispersions in which the fraction of polymer phase having the low glass transition temperature is predominant. Where P1, as is preferred in accordance with the invention, has the lower glass transition temperature, the ratio P1:P2 is situated more particularly in the range from 1:1 to 5:1 and more preferably in the range from 2:1 to 4:1. The weight ratios of the polymer phases P1 and P2 correspond approximately to the proportions of the monomer charges M1 and M2. In the case of Tg(1) being greater than Tg(2), the proportions P1:P2 are situated more particularly in the range from 1:1 to 1:5 and more preferably in the range from 1:2 to 1:4.

The invention also provides a sound deadener composition comprising
(a) a polymer dispersion as described in more detail above, comprising at least one polymer which is obtainable by emulsion polymerization of free-radically polymerizable monomers and is dispersed in water, and at least one protective colloid which is an amphiphilic graft copolymer, and
(b) inorganic fillers.

The sound deadener composition preferably comprises
(a) 5% to 50%, preferably 5% to 20% by weight of solids of the polymer dispersion,
(b) 40% to 80%, preferably 60% to 70% by weight of inorganic fillers,
(c) 10% to 40%, preferably 23% to 28% by weight of water, and
(d) 0% to 10% or 0% to 5%, preferably 0.1% to 3% by weight of auxiliaries.

Suitable inorganic fillers are, for example, calcium carbonate, kaolin, mica, silica, chalk, microdolomite, finely ground quartz, mica, talc, clay, barium sulfate, argillaceous earth, iron oxide, titanium dioxide, glass powder, glass flakes, magnesium carbonate, aluminum hydroxide, bentonite, fly ash, kieselguhr, and perlite. Preference is given to using fillers in flake form such as mica, for example, alone or in combination with customary inorganic pigments such as calcium carbonate, kaolin, silica or talc.

It is preferred to use 50 to 700 or 100 to 550 parts by weight of inorganic filler to 100 parts by weight of polymer dispersion, and preferably 30 to 150 or 40 to 120 parts by weight of fillers in flake form are used to 100 parts by weight of polymer dispersion.

Auxiliaries, used preferably at not less than 0.1% by weight, e.g., from 0.2% to 5% by weight, are, for example, thickeners, resins, plasticizers, organic and inorganic pigments, cosolvents, stabilizers, wetting agents, preservatives, foam inhibitors, glass beads or plastics beads, hollow glass or plastics bodies, antifreeze agents, dispersants, antioxidants, UV absorbers, and antistats. One, two or more in combination of the auxiliaries may be used. Suitable cosolvents are, for example, ethylene glycol, ethylene glycol alkyl ethers (e.g., Cellosolve® products), diethyl-ene glycol alkyl ethers (e.g., Carbitol® products), Carbitol acetate, Butylcarbitol acetate or mixtures thereof. Thickeners are, for example, polyvinyl alcohols, cellulose derivatives or poly-acrylic acids in amounts, for example, of 0.01 to 4 or of 0.05 to 1.5 or of 0.1 to 1 parts by weight, based on 100 parts by weight of solid. Dispersants are, for example, sodium hexametaphosphate, sodium tripolyphosphates, or polycarboxylic acids. Antifreeze agents are, for example, ethylene glycol or propylene glycol. Foam inhibitors are, for example, silicones. Stabilizers are, for example, polyvalent metal compounds such as zinc oxide, zinc chloride or zinc sulfate.

The maximum of the loss factor tan delta for sound deadener compositions of the invention is preferably in the range from −30 to 60° C. Where core-shell particles or other particles having a multiphase particle structure are used, the various polymer phases having different glass transition temperatures, there are in general at least two maxima for the loss factor at not less than two different temperatures. In this case preferably all of the maxima of the loss factor are situated in the range from −30 to 60° C.

The invention also provides a method for damping oscillations or vibrations of vehicle components, where
(1) a sound deadener composition described in more detail above and comprising a polymer dispersion of the invention is provided, and
(2) the sound deadener composition is applied to a vehicle component and dried.

Application may take place in a usual way, as for example by spreading, rolling or spraying. The amount applied is preferably from 1 to 7 kg/m² or from 2 to 6 kg/m² after drying. Drying may take place at ambient temperature or preferably by application of heat. The drying temperatures are preferably from 80 to 210° C. or from 90 to 180° C. or from 120 to 170° C.

The sound deadener composition may be employed, for example, in vehicles of all kinds, more particularly roadgoing motor vehicles, automobiles, rail vehicles, and also in boats, aircraft, electrical machinery, construction machinery, and buildings.

The polymer dispersions used in sound deadener compositions in accordance with the invention have good performance properties in terms of high ease of application and good vibration-damping properties.

EXAMPLES

Materials Used

PC1: Protective colloid 1; graft copolymer having a main chain (40 parts by weight) of polyethylene glycol with an average molecular weight of about 6000 (calculated from the OH number according to DIN53240) and side chains (60 parts by weight) of polyvinyl acetate PC2: Protective colloid 2; graft copolymer having a main chain (30 parts by weight) of polyethylene glycol with an average molecular weight of about 6000 (calculated from the OH number according to DIN53240) and side chains (70 parts by weight) of polyvinyl acetate PC3: Protective colloid 3; graft copolymer having a main chain (60 parts by weight) of polyethylene glycol with an average molecular weight of about 6000 (calculated from the OH number according to DIN53240) and side chains (40 parts by weight) of polyvinyl acetate PC4: Protective colloid 4; graft copolymer having a main chain (80 parts by weight) of polyethylene glycol with an average molecular weight of about 6000 (calculated from the OH number according to DIN53240) and side chains (20 parts by weight) of polyvinyl acetate PC5: Protective colloid 5; Sokalan® CP10, 45% strength aqueous solution of sodium polyacrylate PC6: Protective colloid 6; Acrodur® 950L, formaldehyde-free aqueous resin solution of approximately 50% solids content, comprising modified polyacrylic acid and a polyhydric alcohol PEG Polyethylene glycol VAc Vinyl acetate
Rongalit C Reducing agent; sulfinic acid derivative
Disponil® FES77 Fatty alcohol ether sulfate, sodium salt (32-34% strength aqueous solution)
Dowfax® 2A1 Alkyldiphenyl oxide disulfonate (45% aqueous solution)

Example 1

In a 2-liter polymerization reactor with anchor stirrer and heating/cooling means, a mixture of 180.00 g of deionized water and 350 g of protective colloid PC1 (20% strength solution in water) is heated to 90° C. under a nitrogen atmosphere. Then, at the aforementioned temperature, a portion of 17.59 g of feed 1 and a portion of 1.75 g of feed 2 are added. Feed 1 is a monomer mixture prepared from

| | |
|---|---|
| 1.75 g | of tert-dodecyl mercaptan |
| 84.80 g | of n-butyl acrylate |
| 263.45 g | of methyl acrylate |

Feed 2 is 17.50 g of a 10% strength by weight aqueous solution of tert-butyl hydroperoxide. Feed 3 is 17.50 g of a 10% strength by weight aqueous solution of Rongalit C.

After 10 minutes the remainder of feed 1 is metered in at a uniform rate over 4.0 hours. Feeds 2 and 3 are commenced simultaneously and metered in at a uniform rate over 4.0 hours. After the end of feed 1, polymerization is continued for 30 minutes. Thereafter 12.20 g of water are added and the pH is adjusted to 7.

Example 2

A polymer dispersion is prepared as in example 1, with the difference that protective colloid PC2 is used instead of protective colloid PC1.

Example 3

A polymer dispersion is prepared as in example 1, with the difference that protective colloid PC3 is used instead of protective colloid PC1.

Example 4

A polymer dispersion is prepared as in example 1, with the difference that protective colloid PC4 is used instead of protective colloid PC1.

Example 5

Comparative

A polymer dispersion is prepared as in example 1, with the difference that 135 g of protective colloid PC5 are used instead of protective colloid PC1.

Example 6

Comparative

A polymer dispersion is prepared as in example 1, with the difference that 225 g of protective colloid PC6 are used instead of protective colloid PC1.

Example 7

Protective Colloid-Free Version (Comparative)

In a 2-liter polymerization reactor with anchor stirrer and heating/cooling means, 115.00 g of deionized water are heated to 55° C. under a nitrogen atmosphere. Then, at the aforementioned temperature, a portion of 24 g of feed 1 and a portion of 1.75 g each of feed 2 and of feed 3 are added.

Feed 1 is an emulsion prepared from

| | |
|---|---|
| 114.00 g | of deionized water |
| 10.90 g | of Disponel ® FES 77 |
| 1.94 g | of Dowfax ® 281 |
| 1.75 g | of tert-dodecyl mercaptan |
| 1.75 g | of acrylic acid |
| 84.80 g | of n-butyl acrylate |
| 263.45 g | of methyl acrylate |

Feed 2 is 17.50 g of a 10% strength by weight aqueous solution of hydrogen peroxide. Feed 3 is 17.50 g of a 10% strength by weight aqueous solution of ascorbic acid.

After 10 minutes the remainder of feed 1 is metered in at a uniform rate over 4.0 hours. Feeds 2 and 3 are commenced simultaneously and metered in at a uniform rate over 4.0 hours. After the end of feed 1, polymerization is continued for 30 minutes. Thereafter 12.2 g of water are added and the pH is adjusted with 10% strength sodium hydroxide solution over 30 minutes.

Examples of Sound Deadener Compositions S1 to S7

Sound deadener compositions are prepared from
15.41 g of water
21.86 g of polymer dispersion as per examples 1 to 7
22.64 g of muscovite mica GHL 144
45.36 g of Omyacarb® 20 BG (chalk)
Performance Tests To assess the vibration-damping behavior, the loss factor tan delta at 25° C. is measured as de-scribed in WO 2007/034933 (in analogy to ISO 6721-1 and ISO 6721-3). For this purpose, a steel sheet test specimen with a size of 30×300×1.6 mm is coated with the sound deadener composition under test, and dried.

The coating quantity is approximately 3.0 kg per m$^2$.
The results are set out in table 1.

TABLE 1

Results of the loss factor tan delta measurement

| Example | PEG/VAc ratio | Loss factor tan delta |
|---|---|---|
| 1 | 40/60 | 0.20 |
| 2 | 30/70 | 0.20 |
| 3 | 60/40 | 0.18 |
| 4 | 80/20 | 0.16 |
| 5 | — | 0.12 |
| 6 | — | 0.11 |
| 7 | — | 0.15 |

The results show that a particularly high loss factor is achieved with examples 1 and 2, and that lower loss factors are obtained with ionic protective colloids not based on PEG/VAc.

The invention claimed is:

1. A method for damping oscillations or vibrations of vehicle components, the method comprising:
   (1) applying a sound deadener composition comprising a polymer dispersion and an inorganic filler to a vehicle component; and
   (2) drying the sound deadener composition,
   wherein the polymer dispersion is obtained by emulsion polymerizing a free-radically polymerizable monomer in the presence of a protective colloid, wherein the protective colloid is an amphiphilic graft copolymer comprising a main chain comprising a water-soluble polyalkylene oxide unit and a side chain comprising a polyvinyl ester unit.

2. The method of claim 1, wherein the amphiphilic protective colloid has an average degree of grafting of at least 0.05 graft sites per 50 alkylene oxide units.

3. The method of claim 2, wherein a ratio of polyalkylene oxide units to vinyl ester units is from 10/90 to 80/20.

4. The method of claim 1, wherein the amphiphilic protective colloid comprises:
   (A) from 10% to 50% by weight, based on the overall polymer, of water-soluble polyalkylene oxides as main chain; and
   (B) from 50% to 90% by weight, based on the overall polymer, of side chains, the side chains being formed by free-radical polymerization of
      (B1) 70% to 100% by weight, based on the side chains, of vinyl acetate, vinyl propionate, or a mixture thereof, and
      (B2) 0% to 30% by weight, based on the side chains, of further, ethylenically unsaturated, free-radically polymerizable monomers.

5. The method of claim 1, wherein the amphiphilic protective colloid comprises a main chain comprising a polyethylene oxide unit and a side chain comprising a polyvinyl acetate unit.

6. The method of claim 1, wherein the glass transition temperature of the polymer prepared by emulsion polymerization is in the range from −60° C. to less than or equal to 70° C.

7. The method of claim 1, wherein the polymer prepared by emulsion polymerization comprises at least 60% by weight of at least one principal monomer selected from the group consisting of C1 to C20 alkyl (meth)acrylates, vinyl esters of carboxylic acids comprising up to 20 C atoms, vinylaromatics comprising up to 20 C atoms, ethylenically unsaturated nitriles, vinyl halides, vinyl ethers of alcohols comprising 1 to 10 C atoms, and aliphatic hydrocarbons comprising 2 to 8 C atoms and one or two double bonds.

8. The method of claim 7, wherein the polymer comprises at least 60% by weight of $C_1$ to $C_{10}$ alkyl (meth)acrylates.

9. The method of claim 1, wherein the polymer has a core-shell morphology or is preparable by at least two-stage polymerization, the glass transition temperature of the core-forming polymer being different by at least 10° C. than the glass transition temperature of the shell-forming polymer, or the glass transition temperature of the polymer formed in the first polymerization stage being different by at least 10° C. than the glass transition temperature of the polymer formed in the second polymerization stage.

10. The method of claim 1, wherein the vehicle component is a vehicle bodywork part.

11. The method of claim 1, wherein the sound deadener composition comprises:
   (a) 5% to 20% by weight of solids of the polymer dispersion,
   (b) 40% to 80% by weight of inorganic fillers,
   (c) 10% to 40% by weight of water, and
   (d) 0% to 10% by weight of auxiliaries.

12. The method of claim 11, wherein the inorganic filler is at least one selected from the group consisting of kaolin, chalk, microdolomite, finely ground quartz, and mica, and
   wherein the content of the auxiliaries is not less than 0.1% by weight and the auxiliaries are selected from the group consisting of thickeners, resins, plasticizers, and dispersants.

13. The method of claim 2, wherein the ratio of polyalkylene oxide units to vinyl ester units is from 10/90 to 50/50.

* * * * *